United States Patent [19]
Dixon

[11] Patent Number: 5,799,308
[45] Date of Patent: Aug. 25, 1998

[54] METHOD AND APPARATUS FOR DATA STORAGE AND RETRIEVAL

[76] Inventor: Robert Dixon, Warren Farmhouse, Thame Lane, Culham, Near Abingdon, Oxfordshire, OX14 3DT, Great Britain

[21] Appl. No.: 624,465

[22] PCT Filed: Oct. 4, 1994

[86] PCT No.: PCT/GB94/02148

§ 371 Date: Jun. 4, 1996

§ 102(e) Date: Jun. 4, 1996

[87] PCT Pub. No.: WO95/10091

PCT Pub. Date: Apr. 13, 1995

[30] Foreign Application Priority Data

Oct. 4, 1993 [GB] United Kingdom ............ 9320404

[51] Int. Cl.$^6$ .................................. G06F 17/30
[52] U.S. Cl. ........................................... 707/100
[58] Field of Search .................. 395/601, 602, 395/603, 604, 605, 606, 607, 608, 609, 610, 611, 612, 613, 614, 615, 616; 707/1, 2, 3, 4, 5, 6, 7, 8, 9, 10, 100, 101, 102, 103, 104, 200

[56] References Cited

U.S. PATENT DOCUMENTS 5,206,949  4/1993  Cochran et al. ............ 395/604
5,375,237  12/1994  Tanaka ....................... 395/613
5,519,857  5/1996  Kato et al. .................. 395/605
5,548,749  8/1996  Kroenke et al. ............. 395/613
5,560,005  9/1996  Hoover et al. .............. 395/610
5,584,026  12/1996  Knudsen et al. ........... 395/601
5,594,899  1/1997  Knudsen et al. ........... 395/602

FOREIGN PATENT DOCUMENTS 0 523 269  1/1993  European Pat. Off. .
91 16682  10/1991  WIPO .

*Primary Examiner*—Thomas G. Black
*Assistant Examiner*—Ruay Lian Ho
*Attorney, Agent, or Firm*—McDermott, Will & Emery

[57] ABSTRACT

Data storage is performed using the formation of records having a keyfield which is a numeric concatenation of at least two identifiers. Preferably, the keyfield contains an identifier of entity type and an identifier of an attribute and, more preferably, also an identifier of entity—where entity type is generic, such a "company", entity is specific, such as ABC Limited, and attribute is, for example, "telephone number". The numeric values are preferably obtained from a list of words and/or phrases for which a numeric value has been pre-assigned for each entry in the list. Preferably, some of the records store data and other of the records store details of the relationship between data. Beneficially, some of the records store data and others of the records control data processing.

8 Claims, 6 Drawing Sheets

| A | B | C | D | E | F | G |
|---|---|---|---|---|---|---|
| entity type | version | entity | attribute | multi | multi | multi |

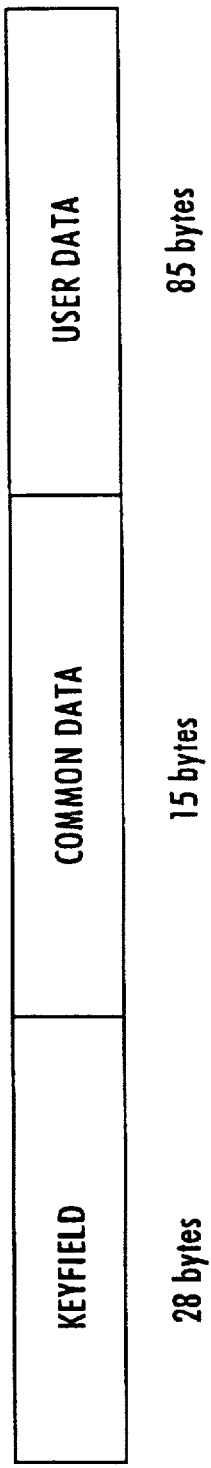

Fig. 4a

| A | B | C | D | E | F | G |
|---|---|---|---|---|---|---|
| 001000090 | 000010000 | 524098921 | 000010694 | 113542000 | 000000000 | 000020019 | - |

| H | I | J | K | L |
|---|---|---|---|---|
| - | 524098921 | 001010000 | 000000019 | 000000000 | 000000000 |

Fig. 4b

| A | B | C | D | E | F | G |
|---|---|---|---|---|---|---|
| 001010000 | 000010000 | 000000000 | 000000000 | 509266000 | 297815340 | 800010019 | - |

| H | I | J | K | L |
|---|---|---|---|---|
| - | 524098921 | 001000090 | 000000019 | 524098921 | 000010694 |

# METHOD AND APPARATUS FOR DATA STORAGE AND RETRIEVAL

FIELD OF THE INVENTION

The present invention provides the basis for the implementation of an improved approach to computing Background Art which is fundamentally different from known concepts and which mitigates many disadvantages associated with conventional computing.

The conventional approach to computing systems usually starts with the preparation of a detailed specification of what is required and how it is to be implemented. This initial stage is often fraught with difficulties. Often it is not understood what is actually required from a computer system until at least part of the system has been seen in operation. Additionally, many systems are so large and complex that it is extremely difficult even to produce a system specification which is completely internally consistent.

The second stage in building a conventional computer system is to pass the system specification to specialist programmers and futher difficulties are often encountered at this stage. Apart from potential problems in interpreting or simply implementing the requirements set out in the specification, one of the biggest problems facing conventional computing is the generation of documentation explaining what the system does and how it does it and subsequent maintenance of the computer programs. A problem frequently encountered in the maintenance of the computer programs. A problem frequently encountered in the maintenance of existing systems arises when it is desired to add an additional field to an existing record structure. Typically, all programs within the computer system which access the file containing the records in question have to be amended.

There have been many studies which show that perhaps as much as 80% of all modern programming effort is spent on maintaining existing systems, thus allowing only 20% of the available programming effort to be spent on developing new applications.

Difficulties arise even at the most basic level. For example, when data is stored on magnetic media, it is conventionally stored either in fixed length or variable length records. Especially where there is a requirement for the sorting of stored data and/or a desire for fast access, the stored data is indexed and fixed length records are preferred. The index may be stored as part of the original data or may be stored separately from it. The index is of fixed length. Fixed length records have the obvious disadvantage that the data must be tailored to fit the chosen length of record.

Very considerable human resources have been expended in devising computer database systems. This expenditure and the popularity of such systems attests to the underlying need for such systems in modern society. The system requirements become ever more sophisticated and one aspect of this has become the requirement for recording and processing of many-to-many relationships. Some known systems claim to meet these requirements. But, as far as is known, they all appear to have certain limitations and/or very complex processing requirements.

DISCLOSURE OF THE INVENTION

The present invention seeks to mitigate all of the above-mentioned disadvantages using a conceptual approach which is distinct from that underlying conventional computing systems.

According to one aspect of the present invention there is provided a method of data storage and retrieval comprising the formation of records having a keyfield containing two numbers, one identifying an entity type and one identifying an attribute of an entity of the identified type.

According to another aspect of the present invention there is provided a method of data storage and retrieval comprising the formation of records having a keyfield containing three numbers, one identifying an entity type, one identifying an entity of the identified type and one identifying an attribute of the entity.

According to another aspect of the present invention there is provided a method of data storage and retrieval comprising the formation of records having a keyfield containing numbers derived from a look-up table or file in which numbers are assigned to words.

According to another aspect of the present invention there is provided a method of data storage and retrieval comprising the formation of data records and records which control the flow of data processing and storage of said records together in a common file.

According to another aspect of the present invention there is provided a method of data storage and retrieval comprising the storage of details of relationships between data as records having a keyfield containing information which enables identification of the keyfield of records containing the data for which details of the relationship are being stored.

According to another aspect of the present invention there is provided apparatus implementing the method described in any of the five preceding paragraphs.

BRIEF DESCRIPTION OF THE DRAWINGS

An embodiment of the present invention and modifications thereof will now be described, by way of example only and with reference to the accompanying drawings; in which:

FIG. 1 illustrates a typical record formed in accordance with an embodiment of the invention, FIG. 2 illustrates the keyfield of a typical record formed in accordance with an embodiment of the invention, FIG. 3 illustrates use of part of the keyfield to store compressed alphanumeric information in digital form, FIGS. 4a and 4b illustrate examples of actual records formed in accordance with the described embodiment of the invention.

DESCRIPTION OF THE PREFERRED EMBODIMENTS

Figure 5A:
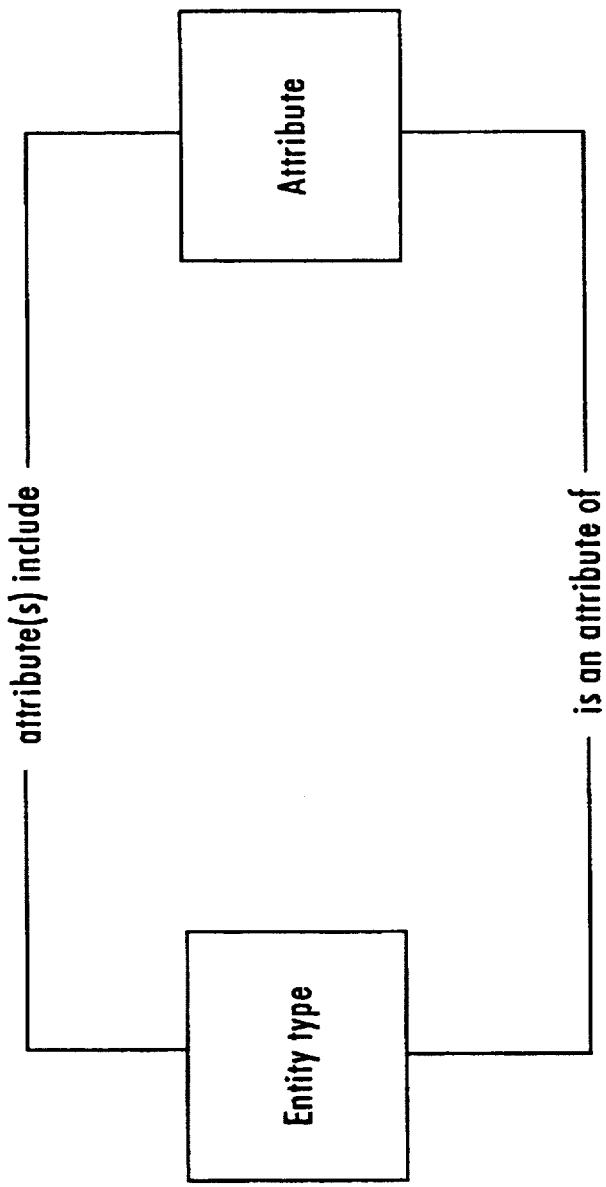
FIGS. 5a and 5b illustrate semantic networks, depicting the relationship between entity type and attribute in one case and between entity type and application in the other.

Firstly, it is necessary to explain the information which is chosen for formation of the keyfield, since this is in itself is an important aspect of the inventive concept. In the following explanation a certain nomenclature is used for ease of reference. The basis of this nomenclature is as follows:

When first considering an item of information, one considers the type of item in question. That is, one considers the "entity type".

Next one considers the particular item itself. That is, one considers the "entity".

Subsequently one considers what is known or desired to be known about the entity. That is, one considers the "attributes" of an entity.

A simple example will be given; based on a hypothetical company called ABC Limited.

the entity type is "company"

the entity is "ABC Limited"

the attribute of ABC Limited is it's actual "business address"

another attribute of ABC Limited is it's actual "business telephone number".

It is obvious that many different entity types may be recorded in a system, many entities may exist within an entity type, and many attributes may exist for any one entity. Entity types may themselves have attributes, if the entity type is being considered as an entity. For example, the feature "business address" can be considered an attribute of the entity type "company", i.e. all companies have a business address.

It is also true that any one entity may belong to several different entity types and that any one attribute may be an attribute of more than one entity type. For example, consider a company which is both a customer and a supplier. The entity values of entity types customer and supplier are both the same, ie. the actual name of the company. Similarly, the attribute values of customer address and supplier address are both the same. The attribute values of contact name for supplier and customer are, however, likely to be different from each other.

Difficulties arise in conventional systems if one attempts to maintain the complex cross-relationships which can arise where one entity belongs to several different entity types. That is, if one sets out to avoid recording each relationship separately. Apart from the size of the data store required, there is the strong desire to avoid storing each relationship separately because of the difficulties which otherwise arise when it becomes necessary to update the data. It is preferable that common data is only stored once. There is then no risk of discrepancies arising between different entries for the same data. Only one entry needs to be updated and data entry is reduced. It is however difficult to achieve such benefits with conventional systems.

Consider another simple example:

ABC Limited has ten employees; consider "company" as the entity type, "ABC Limited" as the entity, "employee name" as an attribute description and, for example, "Kevin Smith" as an attribute value. However, the value of "employee name" can be considered as an entity in it's own right (which can be considered as a sub-entity of the entity "ABC Limited"). That is, entity (or sub-entity) "employee name" may have "business telephone number" as an attribute description thereof. If each relationship is stored separately, the same telephone number is stored ten times, once for each employee. Moreover, if the telephone number changes there is a significant risk that not all ten instances of the telephone number will be updated consistently. Of course, it would be much better to store the telephone number only once. However, the attribute value of attribute description "business telephone number" is really an attribute of the relationship between the company and the employee. If the relationship is broken, ie., Kevin Smith ceases to be an employee of ABC Limited, then the attribute value (ie., actual telephone number) is clearly no longer valid. The entity "Kevin Smith" may well take on a new value for attribute description "business telephone number", but the relationship with ABC Limited is broken and as a result, clearly, the attribute (business telephone number) of that relationship is no longer valid. Removing the relationship also removes the attribute. It is the storage of data in accordance with these concepts which is not achieved by conventional systems. In contrast, the present invention is predicated upon data storage in accordance with such concepts.

As mentioned above in relation to the value of "employee name", entities may have sub-entities. This should be clear from the described recognition that "Kevin Smith" was likely to retain a "business telephone number" even though the previous attribute value (i.e., actual number) was removed because the attribute had been removed as a consequence of the relationship (i.e., employment by ABC Limited) being removed. The fact that "Kevin Smith" retains an attribute with a description "business telephone number", indicates that "Kevin Smith" is in infact being considered as a separate entity. This particular entity was, originally, a sub-entity of the entity "ABC Limited". The sub-entity "Kevin Smith" will have an attribute with a description of "home address". However, "home address" may itself have an attribute. An example might be an attribute with a description of "rateable value". The value of the attribute having a description of "home address" is, thus, itself being considered as an entity. Here we have "Kevin Smith" as a sub-entity of "ABC Limited" and "home address" as a sub-entity of "Kevin Smith". This can be considered as two descending levels of entity. In the described embodiment of the invention, up to $10^9$ values are available to identify separate entity values. By descending one level, ie. considering a first level of sub-entities, a further $10^9$ values become available. If the highest level of entity values each have a separate sub-entity level associated therewith, it can be seen that $10^9 \times 10^9$ values can be stored—and so on, for each sub-level of entity.

Conventionally, one often also has to consider the physical location of the records on the magnetic media. This is likely to have been selected using a hashing routine whereby the pointer to the record relates directly to the address of the physical location on the magnetic media where the record is stored. Consequently, access to the records in a conventional system will often involve significant movement between physical locations on the magnetic media. This can be avoided using the present invention, with consequential improvements in access and processing times.

Going back to a general consideration of the information which is actually being stored, and indeed the knowledge associated with or arising from that information; if one simply inspects a record within the database, there is no indication of the meaning of the data. That is, records do not store the context of the data. In using the system of the present invention, one retrieves the data stored in a record by asking questions the answers to which effectively navigate through the records using the keyfields. Thus, when a certain record is retrieved, the questions or navigation to that record have defined the context in which the data is being considered. Since the context is thus defined, it need not be stored in the records themselves. This in strict contrast to conventional data storage systems. Moreover, a point of prime significance results. Namely, one can change any one individual portion of the database without having to consider the potential consequences upon the remainder of the system. That is, one only need ensure that each individual relationship is correctly recorded to ensure the integrity of the whole system. This is in extremely stark contrast to conventional systems.

In a conventional system, change to any one part of the system must be considered in terms of the potential consequential effects upon the whole of the rest of the system. Often, it is virtually beyond the realistic abilities of the persons responsible to comprehend and adequately deal with all of the consequences arising from a change to one portion of a system. As a minimum, such changes in a conventional system incur an enormous overhead in simply maintaining the system. The time and effort spent in maintaining the system can not, of course, be spent where it would be more productive, ie. in extending the system or building new systems.

An important aspect of this feature is that validation takes place within the database rather than within a separate program.

Thus, it becomes apparent that what is achieved by the present invention is effectively storage of the rules and procedures conventionally encoded in computer programs actually as part of the stored data itself. At the same time, the context of the data is not stored as part of the data, it arises from the data retrieval process itself.

That is, there is knowledge inherent in the data retrieval exercise. But, the presence of such knowledge, or as a very minimum—use thereof, has not previously been recognised. Moreover, the potential to use that knowledge so as to build a system which does not require vast effort to be expended in maintaining the integrity of the system as a whole, has not previously been recognised.

The route taken to reach a record can be considered as navigation through the stored data. The mechanism by which navigation is achieved is explained hereinafter.

In the system of the present invention, simply by keeping a record of the route taken to reach a record enables one to navigate 'backwards' through the database. Such ability is often desirable. It is usually absent in conventional systems and when present involves enormously complex rules and procedures to be applied.

In conventional computing, one builds a prototype to demonstrate and/or prove a proposed application. Subsequently, the prototype has to be encoded to precede the full working system. Usually, it is the encoding stage which is the most time consuming and which is the most error prone. With the present invention, prototyping can be performed on the 'live' system (because there are no potential consequences upon the integrity of the rest of the system) and the prototype is immediately the final live version of the desired application.

These consideration, together with the benefits described above with regard to record location (in the ABC Limited employee telephone number example), result in remarkable improved efficiency compared with conventional computing techniques. Access times on data retrieval are improved. Application development times are vastly improved and there is little point of comparison between the maintenance overheads of conventional systems and the almost complete absence of maintenance of the systems of the present invention.

There are still further advantages which accrue from the present invention. One such advantage is that the whole system is controlled by a very small 'core' program. The core program can be held in its entirety in the processing memory of conventional computing hardware (even with many users and with virtual, or paging, hardware systems). The embodiment being described was implemented on an IBM AS400 machine.

Another advantage accruing from the present invention relates to updates of the core program. If at anytime it is considered desirable to update the core program, perhaps to enable some new form of processing to be undertaken in relation to data stored in certain record types, the updated core program can be implemented with great ease. In general terms, it would be unusual for an update to the core program to be required. However, should any such update be required, it can be dealt with without disturbing the applications rules and procedures. This is possible because what would conventionally be considered as the "applications programs" are not dealt with as "programs". They do not form part of, or modify in any way, the core program. The equivalent of the conventional applications programs are, as previously mentioned, effectively stored according to the present invention as part of the data itself and/or are partially stored inherently as part of the context or navigation involved in retrieving data.

The problem of documentation is largely avoided, because there are effectively no programs in the conventional sense thereof. Thus, there is little to actually document as compared with a conventional system.

The system of the present invention enables the implementation of the definition of an inverse relationship. This is a particularly beneficial feature of the present invention.

The embodiment of the invention which is described herein involves, in essence, the use of a single database file in which various types of records are stored. The records are of fixed length and have a fixed length, relatively short, keyfield. Data is typically stored in terms of the relationships which exist between the data. Data processing is achieved using records stored in the database, in stark contrast to the conventional conceptual view and use of programs. Serious disadvantages inherent in conventional arrangements are mitigated and additional benefits can be obtained.

The records stored within the database may, according to the present invention have many distinct data structures—for the remainder of the fixed length record after the keyfield. Different structures may exist within one particular type of record. Thus, it is convenient to consider records according to their function. The following are functionally distinct record types:

relationship records, simple data records, option records, menu records, surrogate records and transaction records. Although functionally distinct, all of these record types may be stored in a common database because they are all of the same fixed length and all have the same keyfield structure.

As mentioned, data is typically stored in terms of relationships and the corresponding records are referred to herein as relationship records. Sometimes there is independent data to be stored and simple data records are used for that purpose. An option record is the name which is given to a record which is used to control data processing. The selection of the different operations to be undertaken is carried out using so called menu records. So called surrogate records are used to store cross-referencing information. Transaction records are used to implement an independent audit trail. This audit trail is not an intrinsic part of the user data stored by the system. All of these types of record are stored in the same database and they all have the same basic structure. Formation and use of the different types of record are described hereinafter. First, however, a description is given of the common record format and in particular of the keyfield.

Simply stated, the record length used in this embodiment of the invention is 128 bytes in length. Of this, 28 bytes are used to form the keyfield. The keyfield can be considered as consisting of seven fields each four bytes in length, each four byte field being constituted by nine decimal digits stored as a four byte integer. As just noted, the keyfield is composed of digits: ie. it is purely numeric. However, the keyfield will in most practical computing uses need to identify alpha or alpha-numeric data. In the embodiment of the present invention, a separate look-up table is used for at least a major part of the translation between alpha or alpha-numeric and numeric values. It is the particular structure and significance of the various portions of the keyfield from which many of the advantages of the invention accrue.

The look-up table referred to above can be considered as, and is referred to hereinafter, as a word directory. The structure and significance of the various portions of the keyfield are associated with the fact that data is stored by the system in terms of relationships.

An implementation of the present invention has been achieved starting from the creation of a word directory. The word directory was created by entering into a conventional computer database a vast number of commonly used words and proper names, in the English language and in other Arabic character based languages. Each word was allocated a number, the number being stored in association with the word in the conventional database. It was decided that eight digits would be used to record the number, setting the maximum number of words at $10^8$. In allocating numbers to the initially input words, the words were arranged in alphabetic sequence and an approximately even spread of numbers throughout the range 0 to $10^8$ was chosen.

In subsequent development and operation of the system, each word entered into the system is added to the word directory—if, of course, it is not already present in the directory.

The numeric value associated with each word is used when forming the keyfield or index of an item of data to be stored.

One distinguishing feature of the present invention is the use of a fixed length keyfield which may appear to the user to be of variable length. It was decided to produce an implementation of the invention having fixed length records each 128 bytes in length. The first 28 bytes form the keyfield (or index) of the record. However, the invention could be implemented using variable length records.

The fixed length keyfield is achieved in this embodiment of the invention by:

storing data in the keyfield in numeric form, using the word directory, applying data reduction to the information to form the keyfield, and by determining the data to be used to form the keyfield.

Having taken these steps, the inventive concept then enabled further unique features to be realised.

Returning now to the practical detail of how such storage is achieved, attention is directed to FIGS. 1 to 3 of the accompanying drawings. It will be recalled that each record is 128 bytes in length and the keyfield of the record uses the first 28 bytes. The keyfield includes data identifying: entity type, entity, attribute. The actual value of each of entity type, entity and attribute is stored as a separate 128 byte record. The 28 byte keyfield of a record is formed using a concatenation of the numerical values of entity type, entity and attribute of the data which is being stored. Each numerical value is 4 bytes in length and consists of 9 digits. Each 4 bytes is capable of having $2 \times 10^9$ different values (allowing for + and − values). It is therefore apparent that the selection of 4 bytes each of 9 digits to identify entity type (and the same for entity and the same for attribute) will be sufficient for just about all realisable uses of the system. The numeric value of each of entity type, entity and attribute is obtained using the word directory (which is used to form the keyfield of the actual associated records).

In the keyfield, 22 digits are allocated for storage of the alphanumeric (natural language) description of the item which is being recorded. This description is stored in numeric form, thereby achieving a fixed length storage field for what appears to be a variable length item of data. FIGS. 2 and 3 indicate the 22 digits which are used for this purpose. In the embodiment, it was decided that the first five "words" would be sufficient to record the alphanumeric description of any item. This choice having been made and 22 digits having been allocated for the storage thereof, the two are brought together in the following manner:

The significance of the first five words of the description is reduced sequentially. It being recalled that 8 digits are used to define words uniquely in the word directory, the number of digits stored for each of the five words is:

| 1st word | 8 digits (ie. stored in full) |
|---|---|
| 2nd word | 5 digits |
| 3rd word | 4 digits |
| 4th word | 3 digits |
| 5th word | 2 digits |
| Total | 22 digits |

That is, the data compression results in a stored value which uniquely identifies only the first word; with an increasing likelihood of more than one word in the word directory matching the decompressed values of the second to fifth words. However, for functions based on the keyfield such as alphanumeric sorting of the records stored in a database, the correct result is obtained sufficiently often to be acceptable as a system constraint.

The system is capable of storing: $-2 \times 10^6$ entity types, $2 \times 10^9$ entities for each entity type, and $2 \times 10^9$ attributes for each entity.

The keyfield, or index, of each record is thus based upon a unique number made up from the concatenated numeric values of:

entity type+entity+attribute+description 4 bytes+4 bytes+4 bytes+22 digits.

A particularly significant enhanced aspect of the invention arises from the inventive recognition that a unique number is obtained by considering only the concatenated numeric values of entity type and attribute description:

ie. entity type number+attribute description number 4 bytes+4 bytes results in a unique number. This unique number defines the purpose and context of the surrogate number, but does not define the surrogate number itself. Surrogate numbers are explained hereinafter.

FIGS. 1 to 4 of the accompanying drawings illustrate examples of records formed in accordance with the described embodiment of the invention. These figures show various record fields each 4 bytes in length. A maximum of 12 such fields are shown (in FIGS. 4a and 4b) and for ease of reference the fields have been labelled as A to L. Fields A to G constitute the keyfield, ie. the first 28 bytes of the record. Fields H to L are, for relationship records, the last 20 bytes of the record. Other types of record will usually have a different data structure for the remainder of the record after the keyfield. Within each field the individual digits will be referred to as 1 to 9, consecutively. Thus, the first digit of the record will be referred to as A1 and the last digit of the record will be referred to as L9. This nomenclature is purely for ease of reference and is of no significance to the embodiment of the invention.

FIG. 1 illustrates how the 128 byte record of a relationship record according to the embodiment of the invention is formed of a 28 byte keyfield, 15 bytes of common data and 85 bytes of user data.

FIG. 2 illustrates how the 28 byte keyfield is formed of seven fields each 4 bytes in length. The first field contains the entity type number. The second field contains a version number. The third and fourth fields contain the entity number and the attribute number, respectively. Fields E, F and G contain different types of data, in numeric form. Each 4 byte field consists of 9 digits.

Field A contains more than simply the entity type number. In particular, digits A1, A8 and A9 have special significance.

Digit A1 has a value of "0", "3", "5" or "8". A value of "0" indicates that the record contains data. A value of "3" indicates that the record defines a menu. Menus, however, are only a specific form of data. Another record type used in the embodiment of the invention is an Option record. Option records are used for process control. An Option record can control processing of other records, be they eg. simple data, menu records or other option records. To obtain the value of digit A1 for an Option record "5" is added to the value indicating data or menu. Thus a value of "8" in digit A1 indicates an Option record for controlling menu processing.

It has previously been noted that field A contains data in addition to the entity type number. In detail, the entity type number comprises only six digits, these being digits A2 to A7 inclusive. Digit A8 can have a value of '0' or '9'. A value of '0' indicates an entity identifier and a value of '9' indicates an attribute description within entity type and/or attribute values, ie. sub-entities.

Digit A9 is used to indicate the type of indentifier in fields E, F and the first part of G. Digit A9 can have any of values "0", "1", "2", "3", "4", "5", "7" and "8". The significance of the different values is as follows:

| | |
|---|---|
| 0 - name | 5 - text without paragraph heads |
| 1 - number | 6 - not used |
| 2 - date | 7 - uncompressed 8 ch id. |
| 3 - synonym | 8 - uncompressed 10 ch id. |
| 4 - text with paragraph heads | 9 - not used |

A value of '0' signifies an entity type indentifier, ie. initial menu and entity records. This value is not used for second level menus or entity records.

The version number stored in field B contains an indication of, inter alia, whether the data is public or private. In accordance with this setting, different operators might, for example, retrieve different values for the 'same field' of the one record. It is also used in multilingual applications, ie. the same data stored in different languages.

As previously mentioned, field B stores the version number of the record. If the value stored in field B (considering all 9 digits to collectively represent a normal decimal number) is less than 000010000 the contents of the entire record is open to public access. If the value in field B is greater than or equal to 000010000 then the contents of the entire record are restricted to members of the user group identified by the value stored in field B Thus, 99,999 versions of a record can be stored for access by different user groups.

The concept of private data can be used in various ways. This is of particular benefit when one considers that a user's view of the stored user data is that it is made up of multiple (but variable number) of fixed length records, so that the user records appear to be of variable length. The content of field B may be set so as to indicate that the record contains private credit control information. Only persons having membership of the appropriate user group (and having the appropriate security level clearance) are able to access the data contained in the record. The distinction between public and private data can also be used in relation to the storage of rules and procedures, ie. the equivalent of conventional programs. This is significant where part of the data in the record is publicly available and part of the data is subject to private access only As an example of the use of Field B, a commercially prepared "application program" for use with the system might have the content of field B set so as to indicate public data. Any extensions which the user might prepare to supplement the application program would be stored as private data. Thus, any subsequent release of the application program can safely be implemented over-writing only that part of the application program which is flagged as being public data. The user defined extensions will not be over-written by the update process, as is the usual consequence in conventional systems. A further example of the potential use of field B to differentiate between private and public data is to use the distinction so as to identify "private" help text stored in the record. That is, one can implement a help system very readily which is tailored to specific users or user groups.

Fields C and D respectively contain the entity number and attribute description number, as previously mentioned. Surrogate is a type of record number. For a surrogate record, the value of field C is always 0, as is the case of the record shown in FIG. 4B. This implementation arises from the recognition that the concatenation of the entity type number and the attribute number provides a unique number. This unique number is used with the surrogate number in order to navigate through the database, as explained hereinafter.

Although all records are stored in a single file, the keyfield can be considered as identifying different tables of data within the file as well as, of course, the unique records. In this sense, fields a, B, C and D may be considered as identifying a particular table, with fields E, F and G identifying records within a table. In fact, the record identifier consisting of fields E, F and G is prefixed by digit A9 which is really part of the record identifier.

FIG. 3 illustrates how the fields E and F, together with the first four digits of field G are typically used to store the 22 digits formed by data compression of certain alphanumeric information. Digit G5 is used as a suffix to enable duplicates to be distinguished. Digits G6, G7 and G8 are used as a second suffix. This record suffix enables simple storage of multiple relationships between the same records with the same types of relationship. Digit G9 is, usually set to a default is set to a value of "9". If digit A9 has a value of "0", fields E, F and G (first 4 digits) may contain a compressed name or an 18 digit uncompressed number with duplicates allowed, or a 22 digit number, with no duplicates allowed. These different possibilities are dictated by option records. If digit A9 has a value of "1", fields E, F and G (first 4 digits) may store a 9 digit number in E, or an 18 or 22 digit number as described above. Thus, if the record (from the user viewpoint) can be identified by number, a record with A9 set to '0' will contain a compressed name in fields E, F and G. A record with A9 set to '1' will contain a number (18, 19 or 22 digits). If a record is identified by both a 9 digit number and an 18 digit number, digit A9 will be set to '0' and fields E, F and G (first part) will contain 18 digits.

Fields E, F and the first 4 digits of G only contain the previously described 22 digits of compressed alphanumeric data; if the record id is "name". ie. if digit A9 has a value of "0".

Field E for an option record is always zero.

As with field E, the content of field F depends upon the record type as controlled by digit A9. If digit A9 is "0", fields E and F contain the first eighteen digits of the twenty-two digits of the compressed name. If digit A9 has a value of "1", the date of creation of the record is stored in field E and the time of creation of the record is stored in field F. If the value of digit A9 is "7", field E stores the first four characters and field F the second four characters of the uncompressed eight character id.

If a particular record is identified by number (digit A9=1) the first four digits of field G are "0" unless fields E and the first part of G contain an 18 digit name, with duplicates allowed, or a 22 digit name. If the record is identified by name, the first four digits of field G are the last four digits of the twenty-two digit compressed name. If digit A9 has a value of "7", the first four digits of field G will be zero. If digit A9 has a value of "8", the first two bytes of the four bytes of field G are the last two bytes of the uncompressed name.

The difference between an 8 character uncompressed name and a 10 character uncompressed name is that the use of 8 characters allows the presence of duplicates whereas the use of 10 characters prohibits the presence of duplicates. However, duplicate relationships can be created using digits G6 to G8. On the particular computer (IBM AS400) used in implementing the described embodiment of the invention, many objects are identified using a 10 character name.

The value of digit G5 normally has a value of "1" but can be used as a suffix so as to permit the presence of duplicates; when using an uncompressed 8 character ID, that is with digit A9 having a value of "7". However, if a 10 character uncompressed ID is being used, digit G5 is used as part of the first two bytes of the field, in storing the last two bytes of the uncompressed name.

Digits G6–G8 inclusive are used by way of a further suffix to allow the storage of multiple relationships of the same type between the same two records. However, if required, digit G9 can be used as a third suffix for storing extra data in a record. In the described embodiment, the third suffix has not been used and digit G9 has been set to a default of "9".

Each record is one iteration of one attribute ie. contains one attribute value—which may span several fields, with a maximum of 85 bytes available if it is not a relationship. In the event that it is a relationship, 65 bytes are available, plus the cross reference field. Digit G9 could be used effectively to extend the amount of data that can be stored in one iteration of one attribute. Because a cross reference is stored in a record in which a value of "9" is assigned to digit G9 there is no need to set digit G9 to a value of '8' in the corresponding record. Using digits G5 to G8, 4 times 85 bytes plus 65 bytes can be used for one iteration of one record.

Further enhancements of the described embodiment of the invention may use values of '0' to '4' inclusive for G9 as "tags" or "overrides" on records. The detailed potential use of these facilities is not described herein in detail.

In the implemented embodiment of the invention, the core program reads all records for a given keyfield, that is it includes a search for all values of digits G9 in the range 0 to 9 inclusive. Thus, all records are located at once, even though there is only usually one (G9="9"). This improves processing time.

The following is a example of entry of basic entity data. Consider storage of a telephone number. Digit a9 is set to a value of "0" and the twenty-two digits stored in fields E, F and the first part of the G contain "telephone numbers" with room for a suffix to allow for duplicates should this ever be necessary. This is entry for the entity itself rather than a sub-level. Both the entity number and attribute number are 0. That is, fields C and D are both 0.

For relationship records, the user data portion of each record stores, as a cross-reference, part of the keyfield of any related record; eg. the record containing the data with which a relationship exists. The remaining part of the key of the related record can be determined from the context in which the record having the cross-reference in question has been accessed. Attention is directed to FIGS. 4a and 4b. The cross-reference data is stored in fields I, J, K and L. Field I contains a copy of field A of the related record.

Fields A to G are always the keyfield and fields H to L are used to store a cross reference, except for surrogate records, in which case field H contains the surrogate number of the related record. Where only one record is being recorded, for example when the actual value of "height" is being stored rather than storing a relationship, fields H to L inclusive are used to store user data. Otherwise Field H contains the surrogate of any records directly related to that in question. That is, the content of field H for the two records shown in FIG. 4 is the same. Indeed, it will be seen that the value contained in field H of both records is in fact the entity number (ie. the content of field C) of the first of the two records.

The content of fields I to L depends on whether or not details of a relationship are being stored. If the data being stored does not concern a relationship, but more than one record is being recorded at the same time, the content of field I is the same as the content of field A of the other record being written at the same time. In these circumstances, the contents of fields J, K and L are the same as the contents of fields J, K and L of the other record, respectively.

Fields I, J, K and L contain the cross-reference; unless the record is a surrogate record or only one record is being recorded at that time. In these later cases, fields I to L contain part of the user data. In the case of a surrogate record; in a relationship, the surrogate number of both records are stored. Fields J to L for a surrogate record contain part of the keyfield (ie., E to G) of the fourth record written, where a fourth record is recorded.

Relationship Records

Consider storage of the telephone number of ABC Ltd. In order to store this information, three records are written to the disc. These records are: (1) a surrogate record, (2) user of telephone number, (3) telephone number of user. Records 2 and 3 are effectively the inverse of each other.

First, the surrogate record is written. The value of digit A8 is set to "9", which identifies the record as a surrogate record. The entity number is written in field C and the attribute number is written in field D. Thus, the keyfield can be constructed.

The value of field A is known. At a system level one chooses either business or telephone number as the prime (that is, the one under which the surrogate record is written) and this selection is controlled by an option record. In this case the value of field A identifies the entity type client.

Field B is the version number, which simply records whether or not the data is available for public or private access, or is one language or another.

Field C is zero.

Field D stores compressed form of the attribute description, ie., the surrogate of the attribute description, in accordance with the menu selection, eg. telephone number for speech. That is, the content of field D is actually the surrogate number of attribute.

The content of field E is the surrogate number of the relationship being created.

The surrogate number is determined in the following manner. First of all, a notional record keyfield is prepared in which the value of "9" is assigned to all of digits E1 to E9 inclusive. An attempt is then made to position the pointer within the database. Read backwards one record to locate the last surrogate record for this entity type and attribute combination. Add "1" to the value of field E, if there is no previous surrogate the value will be "1". This then gives the new value for field E, that is the surrogate number to be used when the currently being prepared record is written.

The value of field F is always zero.

The content of field G is the same as in the case of the normal entity record. In the case of the described implementation of the invention, the value of field G for a surrogate record is 000010019, because duplicate surrogates are excluded.

The number provided by the concatenation of fields A, B and D is unique. Thus, the number provided by the concatenation of fields A, B, D & E is unique. It is particularly important to note that the surrogate number is only relevant in the context to which it applies. The content of fields A, B and D define that context. That is, the key consists of fields A, B, D and the surrogate number (field E). Thus, the implementation of the invention is not limited by a nine digit surrogate number.

Fields H to L contain the surrogate number of the two related records, if either or both of the records are identified by surrogate. Generally, fields H to L are not used for this purpose, unless four records are being written simultaneously rather than three. Often, only three records are written. Four records are, however, written at various times, for example for the preparation of menus. In this case the four records are: surrogate, of attribute value, sequence number within attribute, name of menu in which attribute appears.

The Second Record to be Written (Recordal of Relationship)

What are here described as the second and the third records can effectively be interchanged without any significant effect.

Field A contains the entity type number (telephone number).

Field B contains the version number

Field C contains the entity number, which is the surrogate of the actual telephone number. In writing the record, the surrogate is determined and is then used as the identifier.

Field D contains the attribute number. That is, the "telephone number for speech of", which is the surrogate of attribute description.

In accordance with the preceding paragraph, it is to be noted that the recordal processes is more complex than described here. For new entities or independent data identified by name, it involves cross checking with the word directory and potentially writing new records to the word directory.

Fields E, F and the first half of G are used to store the compressed name (ie. ABC Ltd.). The second half of field G is used for suffix information, as described above.

Field H is the surrogate number, which is the same as the content of field H of the surrogate record. Thus, the value of field H is the same in all related records (apart from surrogate records—for which there is no need to store the number twice within that record).

Field I has the same value as field a of the related (ie. third) record. That is, the entity number—with its prefix and suffix.

Field E has digits E6 to E9 inclusive set equal to digits G6 to G9 of the related (ie. third) record. That is the suffix. Thus, one can identify if any duplicates exist. The purpose is to know the key when duplicates do exist.

Digits E2 to E5 inclusive contain the version number of the related record, if not zero. This enables determination of the value of field B of the related record. That is, the user of group number. (Indeed, the user group number is usually the actual value of field B).

Digits E2 to E5 inclusive may all have the value "zero", in which case the value in field B is the user group number, if any of digits E2 to E5 has a non-zero value, then digits E2 to E5 contain the value of field B of the related record. That is, digits B6 to B9 inclusive of the related record are respectively equal to the values of digits E2 to E5, with the value of digits B1 to B5 inclusive being zero.

Third Record of the Relationship

The third record is written in the same way as the second record; but in the inverse.

As can be seen from the second and third records, one can identify the surrogate record, but one only has the partial key of the related record in the cross reference. However, because of the context, it is possible to determine the full keyfield of the second (related) record.

In order to achieve this, one cannot use the surrogate, because fields E, F and the first half of field G of the second record are not recorded in the cross reference (fields I to L of the third record).

However, one has arrived at or identified the third record (or higher level attribute value surrogate) via the entity record of the related record, and that contains the missing information. An array in the core program records the content of fields E, F and the first part of field G of the entity record. The core program keeps the full history (using this data storage) for up to 99 levels. This enables the backtracking facility within the system. More than 99 levels can be tracked by using a temporary storage file.

Fields A to G use 28 bytes. A further 65 bytes are used for user data (as we are concerned with storage of a relationship). As usual, 15 bytes are allocated to common data (which includes a transaction number—no use being made of the AS400 relative record number facility). The 4 bytes of field H contain surrogate number. The remaining 16 bytes, which contain cross reference information, are stored in fields I to L.

The advantage of the described arrangement is that if ABC Ltd. changes its name, the key of the third record will not change for telephone number. The second record does, of course, change.

Thus, the system of the present invention provides multi level data recordal, in contrast to systems where it is necessary to delete all sub-levels and re-enter all of the associated data. In the present invention, it is possible simply to "move" the sub-level which is no longer valid; and all subsequent-levels also move "automatically"; because the surrogate number does not change. The attribute value is moved from one entity type and attribute description to another. In contrast, the surrogate number would change if the no longer valid sub-level were to be rewritten rather than "moved".

The arrangement described in the preceding paragraph does not work if one is changing the whole of the value formed from the concatenation of entity type number, attribute number and version number; because with that unique number the surrogate number being used may already have been issued.

The gain in performance achieved by the present invention is that the system only reads very few records at any one time. This is very beneficial to user productivity. Overall, the system uses only simple, small steps—in contrast to most conventional systems in which the number of processing steps to be executed can take a sufficient length of time for the user to lose their concentration. In terms of virtual system computer hardware, the present invention will use very little paging.

Option Records

Reference has been made to the rules and procedures conventionally encoded in computer programs being in the present invention stored with the data. This has been conveniently implemented using records in which the 4 byte entity type number in the keyfield is left blank. For ease of reference, such records may be referred to as Option records. Option records can be used to regulate the path of data retrieval. That is, the content of an Option record can be used to determine which records are accessed in response to a particular input. This can be used to implement "relative" security within the system. The term "relative" does not here imply any potential compromise of security, in fact, the opposite. Relative security is often desired of, but rarely achieved in, conventional systems. It is the ability to assign, especially dynamically, different levels of security to a single user of the system. This can be a security level which varies in accordance with the application being used. Of course, assigning one digit within the Option record enables 10 security levels to be allocated for any particular function. Many security codes are stored to control security over many different functions.

Option records are used to define the valid record identifiers for use in a particular table. Option records are used to determine the way in which data is displayed. Option records are used to control the allocation of surrogate numbers. Option records are used to control the interval number applied between subsequent records. That is, the interval for surrogate records is set to "1" whereas the interval for paragraph headers or short names for text is set "10000".

Text is identified by surrogate, then by paragraph header sequence number or paragraph numbers in document and then by the first five words. Text is a record type (structure) rather than function. Text is stored in the sequence identified by the surrogate numbers allocated upon its initial input. Consequently, one can change either of the sequence number or the words—while retaining unique identification of the text.

It should be noted that text is integrated into the database and is not processed separately.

Reference numbers can be used to set priorities for batch processing.

All of these types of facility are controlled by option records.

Keyfield of an Option Record

A default may be set for entity type, entity and attribute. The purpose is to reduce the number of option records required. However, option records for addresses have a default set for entity type, but are specific for attribute.

A menu record is used to specify which default and which option records are to be used.

The value of digit A1 with the addition of "5" identifies whether the option record is concerned with data or with a menu.

Digits A2 to A7 inclusive store the entity type number, but the default setting is zero.

Digit A8 is not used in the described implementation of the invention and is therefore set either to "zero" or "9". It is always the same as in the data records for which it is used.

Digit A9 is set to the value of "1", because the record is identified by an option number.

Field B contains the version number. It can be zero and is determined by an option record. Although a general facility, the distinction between private and public data is particularly useful for option records, since it enables different rules to be encoded for different users (for example within a single "cell" of a spread sheet). The facility can also be used to identify a user version of an option record and, if found, to override the public version thereof with the user version.

Field C contains the entity number, and for an option record this is normally zero.

Field D contains the attribute number. For an option record, the value of field D is zero unless special characteristics are required for the table, in which case these will usually relate to a particular attribute. For example, address identified by post code within an option record for address.

The value of fields E and F are both zero.

Field G contains the number of the option record, using digits G1 to G5 inclusive. Duplicate option records are not permitted in the described implementation of the invention, thus digits G6 to 8 are allocated the respective values of "001". Digit G9 is allocated the value of "9".

The option record contains no cross reference field. Thus, 85 bytes are available for the storage of user data. This can be extended to 170 bytes by writing a second record, in which the value of digit G9 is set to "8" rather than "9". Thus, this is one example where a significant change may be made without the need to restructure the whole of the data base.

Option records can be associated with specific applications. For such use, an application number is stored as part of the keyfield, conveniently in field C.

The option record can be considered as a filter which controls access to the table to which the option record applies.

Use of Option Records

Option records can be used to restrict access to view only, that is exclude edit. Thus, if security access is required to implement changes of address, a alternative option record would be provided to enable that facility.

Option records can be used to identify an exit program. Additionally, option records can be used to control reading, by the system of the present invention, of data files which were not recorded using the system of the invention—using exit programs.

Option records may be used to implement dynamic changes to user security levels.

Within the common data area of each record, three characters are allocated as a record identifier. Each of these three characters may be allocated a character in the range A to N or "0" to 9, inclusive or certain special characters. That is, the total number of permissible identifiers is $40^3$. However, this does not restrict the total number of identifiers to sixty four thousand record types; because the identifier relates to the specific structure of the record, eg. name. These are record types, ie., attribute value types. The total number of identifiers under the heading entity is sixty four thousand. Similarly, the total number of possible entries under the heading attribute is sixty-four thousand each of which can be itterated by one billion.

It is an option record which defines the three character record type code when new records are added.

Generally, one retrieves an entire table. That is, one receives all records (subject to security) rather than just those with the same record type, as defined by an option record.

Many option records may exist for a single table within the data base. Thus, different record types are permissible within a single table.

Within an option record, there is one byte which controls the length of name stored in records which are added to the data base using that option record. Thus, whereas conventionally there is a very high overhead in changing between or allowing for, say, a twenty five character name length rather than, say, twenty four character name length; with the present invention one simply uses a different option record when writing the data to the disc. The name length is part of the common data area of the record written.

Option records may also be used to implement commitment control. In this respect, option records can be used to set transaction boundaries. Specifically, one option record may store the start sequence for the commitment control and another option record may control completion of the commitment control process. In a conventional arrangement, it is not possible to insert extra steps within a commitment control procedure without careful consideration of the consequences upon the procedural steps on either side of the point of insertion. However, consideration of such consequences can be avoided using the arrangement of the present invention.

Option records are used to control the number of records to be retrieved simultaneously. One character within the option record is used for this purpose and consequently the number of records to be displayed is readily controlled in the range 0 to 9 inclusive, where 0 can be high rather than low.

Option records can be used to control paragraph headers and paragraph text. That is, they can be used to display long or short names (any length or two hundred and fifty six characters).

An option record can be used to define whether or not a long name will be present.

Generally speaking, one line on the display screen is equivalent to one record. In this arrangement, a long name is one line per record and the name could be, say, ten thousand lines long.

Option records can be used to control processing, such as to prompt the display a message to the user when access to requested information is denied. Similarly, option records are used to control process flow, for example to return a user to a menu or to the main related entity record.

The processing control which can be achieved with option records is extremely flexible. For example, it is very straightforward to implement option records which upon input of a telephone number identify the owner of that telephone number and switch processing to a menu so that other attributes of the owner can be selected for inspection.

An option record may contain the number of the next option record to be used to access another table.

Menu records also contain option record numbers. This number is added to the number in the option record being used to give the actual number used in processing.

Transaction processing can be used to implement Boolean logic. For example, consider a table comprising five entries. If the display control character is set to the value of "1", the processing searches for a single record. The option record controlling the transaction processing then stipulates what action is to be taken if that record is or is not found. Thus, option records can be set as decision makers within the database.

Consider as an example, price updating in an ordering system. One wishes to implement time dependent pricing. This can be achieved using keyfields which are date and time stamped, ie., field E is set to date and field F is set to time. The 9th digit of the date is used to check that the date is correctly stored. The first digit of field F is used to check the accuracy of recordal of time. The option record is set to read the table backwards until a record is located which has a keyfield which is valid when compared with the current date and time. Using this system, one can readily implement a price expiry when a new price is input. That is, one reads backwards in time, effectively, to find the price recorded with the most recent date and time before the date of the transaction. This is to be contrasted with a conventional system, in which the price would typically be given a validity date range, from one date until another date. The difficulty with such a system is what processing should apply if the date of the transaction falls outside the date range of the prices recorded in the database. However, in the implementation according to the present invention, one does need to encode an expiry date, because the price becomes redundant and invalid as soon as a new price is entered. All further transactions are then immediately conducted at the new price. Equally, one can "encode" discounts, market sectors, etc.

The important thing to note is that all of this "processing" is encoded within and takes place within the database itself. The processing is not stored in nor controlled by a "program" in the conventional sense. One simply writes an extra record into the database specifying what new discount is to apply, for example. This avoids one of the major disadvantages of conventional systems which would typically require a duplicate database to be established (encoding the new price −) with the consequential difficulties of maintaining the two copies of the database consistent with each other until such time that the duplicate replaces the original to make the price change effective.

Option records are used to control processing in a manner analogous to error trapping. That is, the response of the system when no records are found or more than one record is found in response to a user inquiry is controlled by an option record. Further processing can also be controlled by the option record. For example, if the selected data item is not retrieved in response to an inquiry, the option record may present the user with the option of actually adding that data to the data base. Similarly, the option record can be set to advance automatically, or not, to the next processing stage when a requested item of data has been retrieved. For example, if one enters an address, there may be little benefit in advising the user that the address has actually been located within the system. It may be more beneficial to progress to the next stage of processing which is to retrieve the associated name and present that name to the user for checking. In fact, this concept of using option records together with menus leads to the concept of the creation of procedures. Procedures execute a number of sequential processing steps, dependent upon the requirements of each step being individually fulfilled. This can be considered as a form of "one entry" menus which have an auto advance between each of them.

The common data area format is as for other records.

As previously mentioned, within the option record one digit controls the number of records to be displayed or accessed. If this digit has a value of "1" and the option record specifies auto advance, the option record has then become a procedure.

Procedures can be used to force data entry. For example, if one is using a menu which accesses one record at a time, an option record can be used to check for the existence of the specified record and in the event that it is not located, it prompts for the value to be entered.

Default option records have the value for each of the fields associated with entity type, entity and attribute set to zero. However, it is possible to implement different levels of default, in which case the values within these fields may not all be zero. For example, if the attribute is to be non-blank, the attribute number would not be zero.

Field L contains the option record number.

Menus

In order to access records in a database in accordance with the present invention, it is necessary to specify the entity type number and the attribute number. The actual processing which takes place will often involve the use of an option record, including the use of an option record number which is accessed by a menu record. The menu record may also be coded to indicate if the option is to be taken as a default at the entity or attribute level. Digit A1 of the option record has a value of "5" or higher. That is, to form an option record "5" is added to the value of digit A1 of the type of record being accessed or controlled by the option record. The record type code, the three character record type code referred to above, begins with the letter "F". This three character record type code is part of the common data within each record within the database. The letter "F" as the first character of the code indicates which data structure is to be used.

The value of field C will be the application number for application-related menu records. The value of field C will be zero for an application independent menu. The corresponding option records determine, of what type the menu record should be.

Menu records are identified by digit A1 having a value of "2" or "3". A value of "2" signifies that the menu record is for controlling routes to a current position, whereas a value of "3" signifies that the menu is for controlling routes after selecting or finding a record.

The keyfield or a menu record is constructed in the same manner as generally described previously for other record types, apart from the value of digit A1. For example, the name of a menu is encoded as entity type.

The common data area of a menu record has the same format as any normal record type.

The three character record type code located in the common data area of the record has a format in which the first character is part of the exit program name. For example, in relation to exit programs, the first character of the three character record type code is the same as the fourth character of the program name. Using this nomenclature, all exit programs have a name in which the first character is E (signifying Erros—the name given to the system of the present invention) followed by a two character version number. Thus, if one wishes to add a different record data structure, one does not have to change the main body of the core program, one simply appends an exit program or an existing one entered.

Transactions Summary

A transaction record is written for each transaction. The transaction record has the entity type number set to zero. Digit A1 has a value of "0", because it is a data record. Digit A8 is "0". Digit A9 has a value of "1", because it is a number.

Transaction numbers are generated by setting all of digits of field D to the value of "9" and then reading backwards until the last transaction number is located. A value of "1" is then added to the last transaction number so as to form the new transaction number. This process is the same as that described above in relation to the generation of surrogate numbers.

Typically, a transaction record might store details such as: user number, company, department, date and time, application number. Use of the transaction summary enables ready implementation of an "undo" facility.

Navigation and the Browse Facility

One can browse or navigate through the database, moving between entity type, entity and attribute. Using the keyfield, and particularly fields I to L of an attribute, one can identify the entity type and identifier. The value stored in field I identifies the entity type. That is, it identifies the value of field A of the related record, except that digit A8 is set to "0" in the related record, compared with having a value of "9" in the cross reference field of the attribute. The version number of the related record can be determined from an inspection of digits I2 to I5. If all of these digits have a value of "0", then field B of the related record contains the user number. However, if digits E2 to E5 are not all zero, then digits B1 to B5 of the related record are zero and digits B6 to B9 have, respectively, the values of digits E2 to E5.

Thus, the values of fields A and B of the related record are determined.

The entity number and attribute number of the related record, that is the value of fields C and D, are zero. This is the case because one is considering the starting point (or top) of the data tree.

Generally, the values of fields E and F remain unchanged between the attribute record and the related record. However, the last four digits of field J give the value of the last four digits of field G of the related record—although this usually means no change.

Thus, the entire keyfield of the related record has been constructed from the context. Moreover, this process of constructing the keyfield of a related record can be used in either the forward or backward direction.

Much can be achieved simply by using attributes. For example, consider the difference between "messages", which simply lists all messages, and "messages received", which lists only those messages sent to the particular user in question.

Context

One can only access data in a particular context, that is as a result of a specific enquiry. Thus, when one views the content of a particular record, the context of the information stored in the record is known. Moveover, the information is never out of context.

Application Structure

An application can be considered as a filter to the overall database. For example, one may wish to assign a subset of the database to invoice processing. An application allows access to the records, procedures, etc. which are relevant to invoice processing.

Figure 5B:
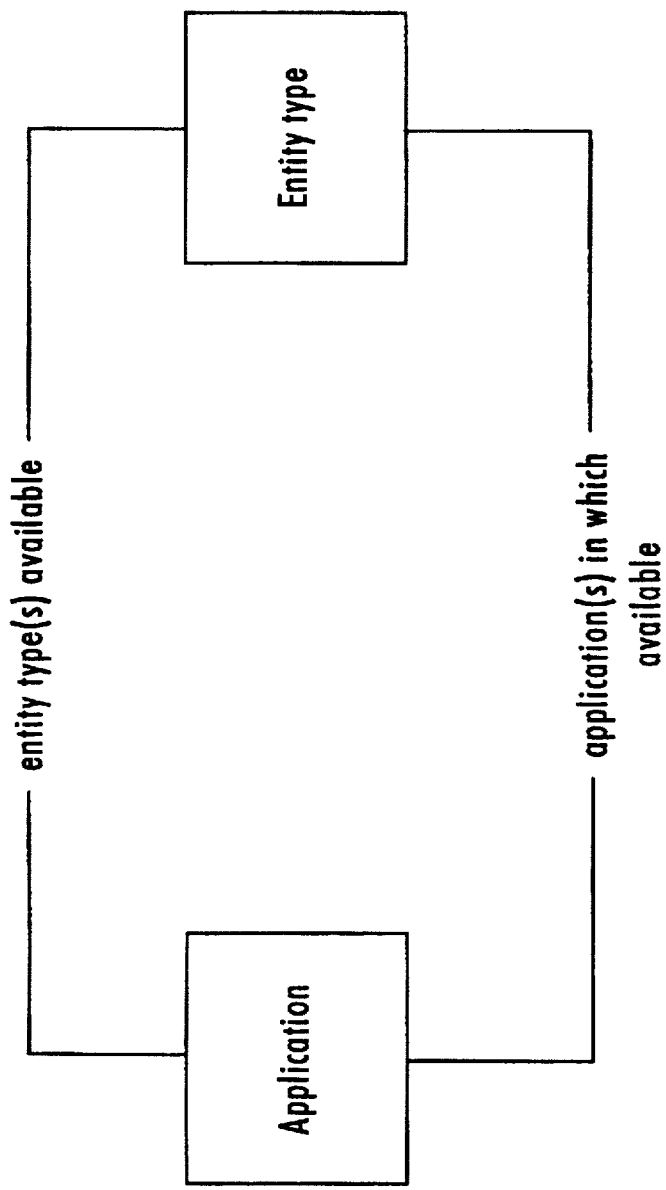

An application is an entity type. This is illustrated in the semantic networks shown in FIGS. 5a and 5b of the accompanying drawings.

A menu filters the attributes which are available for each entity type in an application. Thus, one only needs to store the attributes once.

If one wishes to access all attributes, one should use an application independent menu (ie. no filter). This is to be contrasted with the conventional approach of "coding" the required attributes within an application program. The overall concept is to take the processing away from "encoded programs" and put the processing as part of the actual data storage.

Figure 6:
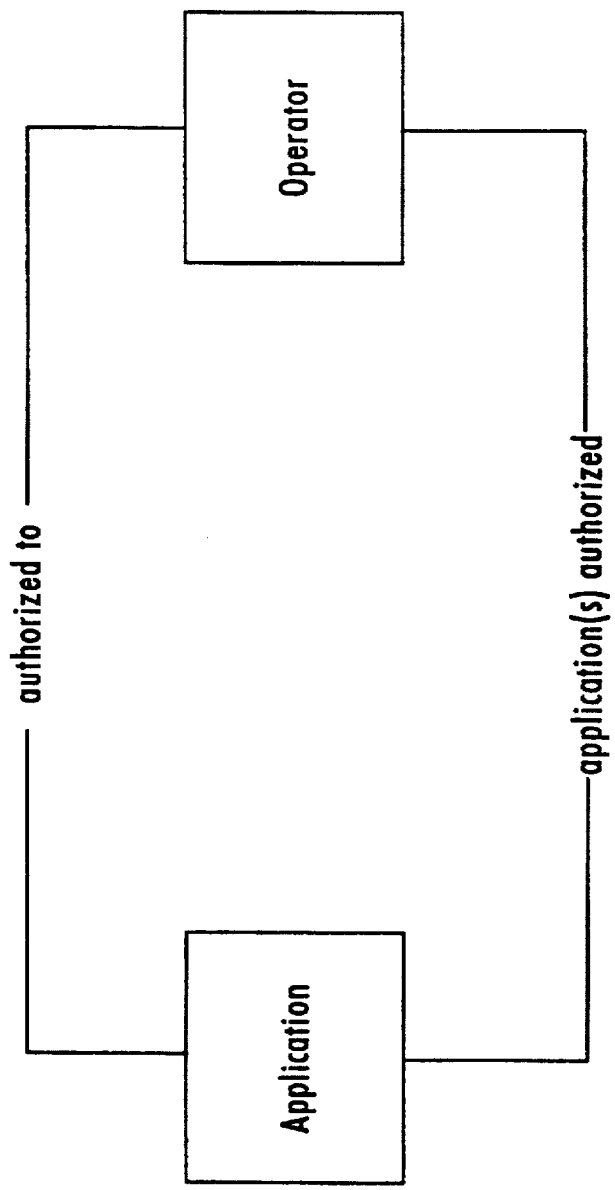
FIG. 6 illustrates a semantic network depicting the relationship between application and operator.

An example of an application is indicated by the semantic network shown in FIG. 6 of the accompanying drawings. The application is "security" in which the entity type "application" is available. An attribute of the entity type is "authorised to". Again this is to be contrasted with the conventional arrangement in which the security is encoded within each application.

The operator can only use applications which he has access to because he has the appropriate attributes as a user, ie., data and rules are considered as being essentially the same. Thus, a user navigates through rules in the same way that he navigates through data.

Also available within the system is a start-up application. This application enables one to change the start-up procedure without changing the core program. An attribute of "applications authorised" lists those applications which are available to be run. After having listed the applications, one commences navigation through the database.

Using this technique, nested applications can readily be implemented and security checks can be included at each level.

Similarly, it is possible to encode a new document creation application. Such an application may include procedures to solicit data such as author name etc.

Files

Only one file (or database) is required. The keyfield of each record is unique and therefore there is no need to establish more than one file. However, for operational reasons, it may be desirable to split the database into several different files. For example, one may wish to make such a split in order to separate user data from public data. Similarly, one may wish to make such a split in order to separate application definition data from the data to which the application applies. Thus, for distribution purposes one can change the application without overwriting the user data to which the application applies. Thus, third party "software" can be implemented using the system of the present invention in a manner directly analogous to that of conventional systems.

Another set of circumstances in which it may be desirable to establish more than one file is where one wishes to purge or archive data. This could be particularly applicable where the data comprises messages or documents.

Another instance where it may be desirable to establish more than one file is where the user data is of specific interest or type, for example a database concerning Fine Art.

A further example where one may wish to establish more than one file is where configuration data is to be stored, concerning for example the list of computer terminals and the operators who may access the computer via those terminals etc.

In the embodiment of the invention described herein, a total of seven different files have been used. These files contain:

(1) The word directory
(2) The user data
(3) Private data
(4) Public application data (eg. a list of countries)
(5) Public application data; specific (art history) rather than general
(6) Application definitions (including the Thesaurus)
(7) Configuration file
(8) Message text file
(9) Transaction Summary The only other part of the system is the core program, which contains less than one megabyte of instructions.

Thesaurus

An important feature is the thesaurus which is distinct from the word directory file. The thesaurus forms part of the main database and "thesaurus" is an entity type. The thesaurus includes phrases (in any language), in contrast to the word directory which only includes individual words. Every term used to define the structure of an application of the database must first be entered into the thesaurus. As part of that process, a surrogate number is allocated.

Every word used as an identifier throughout the system must be included in the word directory. However, the thesaurus does not necessarily include the whole of the word directory.

Figure 7:
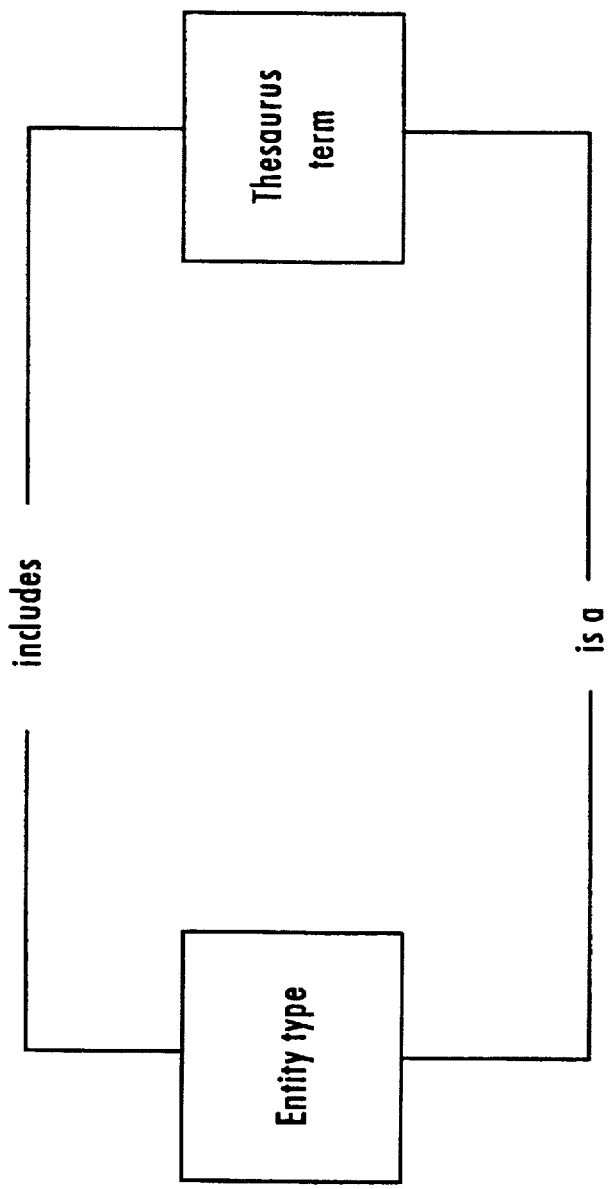
FIG. 7 illustrates a semantic network depicting the relationship between entity type and thesaurus term.

The thesaurus is the central repository of terms. Every term required to define the structure of the database must be included in the thesaurus. Thus, to add a new entity type, it is first necessary to put the entity type name into the thesaurus. This is illustrated by the semantic network shown in FIG. 7 of the accompanying drawings.

Subsequently, one can access the thesaurus to discover whether the particular name is an entity type.

The thesaurus forces the use of standard words and phrases. Thus, digit G5 may allow duplicates, but they will each have a different surrogate number.

As an example of the contrast between the word directory and the thesaurus; the word directory stores the word "red" only once. The thesaurus may have the word "red" stored several times, for example as a colour as a first occurrence and in elation to politics as a second example. One can thus interrogate the thesaurus to retrieve a list of the potential meanings of the word "red".

The thesaurus allows one to find out what other knowledge there is in the system relating to the word "red".

The thesaurus is not used in all transaction processing. For example, consider the attribute description "is a". Although the phrase "is a" may be retrieved from the thesaurus; the navigation through the database is immediate, because the processing is from that initial thesaurus lookup through entity type to entity. The expression "thesaurus" is an entity type and "entity type" is in the thesaurus.

Multiple User Groups

It is possible to accommodate multiple user groups on one system. One may create a separate file for private user data and new user groups may be added with ease. In searching records, the core program always looks for the user group number.

A member of one user group can send messages to a member of another user group.

Using the user group number as part of the keyfield, inherent security is achieved. Cross access between data belonging to different user groups cannot be achieved. Thus, it is very straightforward to prevent access to other group data or vice versa, because this is part of the keyfield of the relevant records.

Core Program Structure (1) "Request processing" program. Main operation interface.

(2) Main program which accesses database. Overall controlling program. This does all calling of other programs.

(3) "Database update" program, which also provides text processing interface with the operator.

(4) Exit programs: ERROS or user defined, e.g. maths/printing/differential screen display.

Exit Programs

Exit programs conveniently adopt the following naming convention, part of which has been referred to above. The first character of the exit program is always the character E (signifying ERROS—the name used in relation to the system of the present invention). The second character specifies the release number of the program. The third character identifies the modification of the program. The fourth character is the first character of the three character record identifier of the type of record being processed by this exit program. The fifth character of the exit program name specifies the version number of the program. This character can be assigned any character in the range A to Z inclusive or any digit in the range 0 to 9 inclusive or some special characters. The six to tenth characters of the exit program name identify the user group number. This may be zero, indicating that is available to any user group.

User specific option records identify which version of the program should be used, and whether or not it is their own user group or a publicly available version of the program which is called by the option record, for a particular user group.

This naming convention makes it easy to avoid confusing different versions of the same program and every node can define for each user group which version of the program is to be used. This may include simple choices such as different screen painting or could incorporate more esoteric requirements.

The exit programs may be contained in a program library. The name given to the program library should preferably use the following naming convention. The first character of the library name is the character E. The second character identifies the release number. The third character identifies the modification. The fourth character identifies the modification level. This naming convention is particularly useful for certain computer hardware types. For example, the IBM AS400 machine uses a library list in which each job has an associated library list.

A major advantage of the system according to the present invention is the small amount of memory resident code (core program) which is required. Indeed, this advantage arises from the fact that the core program is sufficiently small that it can always be resident in memory on a machine such as the IBM AS400, consequently, the requirement for paging of programs is largely avoided.

Help System

An on-line help facility is readily implemented, by specifying the help file as an entity type. Thus, with an entity type of "help" an entity of "business" and an attribute of "telephone number" one forms a surrogate record of the relationship between "business" and "telephone number", which record contains a description of that combination. Since the entity type becomes the entity when considered in a different context, very little processing by the core program is required in order to implement the help system. The help text is stored for a particular entity type rather than for each individual entity.

Help menus need not be application specific.

Use of the help system is thus the same as access to any other type of data recorded on the database. One navigates through the relevant records in the same manner as described previously.

The above described on-line help system completely avoids the conventional approach which is to establish a fully separate on-line help data base and associated set of programs.

The specific description of the invention given above was set out in British patent application number 9320404.8 filed on 4th Oct. 1993. Since that date various modifications have been implemented and tested. Of note among such modifications has been an embodiment in which the above described Option Records have been functionally merged with the above described Menu Records. The principles remain unchanged, but a single record type is used in place of the previous two. Another modification has been the use of the Surrogate Records to store further data. As described above, the Surrogate Records exist to record the surrogate number, which can be considered as the primary internal identifier of the system. Additional data can however be stored in the Surrogate Record. Such additional data should relate to the content of the records to which the surrogate relates and, preferably, be displayed with the content of the related records.

Since October 1993 the initial implementation of the invention has been independently test. Such tests have calculated the improvement in efficiency of developing a new application (ie. suite of "programs") as being as much as 500% or more, compared with conventional programming techniques. The tests have also reported improvements of the same order of magnitude in operating speeds of the completed application.

I claim:

1. A method of storing and retrieving data using an electronic file, the method comprising the steps of:

providing a list of alphanumeric descriptions to each of which is assigned a number;

entering data to be stored in terms of an entity type and an attribute of the entity type;

retrieving from the said list the respective numbers for the entity type and for the attribute;

forming a keyfield by concatenating the number identifying the entity type with the number identifying the attribute of the entity type; and writing a record to the electronic file, the record comprising the said keyfield and a data part.

2. A method as claimed in claim 1, wherein the step of entering data to be stored includes entering the data to be stored in terms of an entity of the said entity type in addition to the entity type and the attribute of the entity type; wherein the step of retrieving from the said list includes retrieving the respective number for the entity; and wherein the step of forming the keyfield comprises concatenating the three numbers retrieved from the said list.

3. A method as claimed in claim 1, wherein part of the keyfield indicates the structure of the data part of the record.

4. A method as claimed in claim 1, wherein some of the records store data and other of the records store details of the relationships between data.

5. A method as claimed in claim 1, wherein some of the records store data and other of the records control data processing.

6. A method as claimed in claim 1, wherein the storage of an item of information involves the formation and recordal of three records each of which contains identifiers enabling the other two records to be identified.

7. A method as claimed in claim 1, wherein the numeric values of the said provided list is calculated for alphanumeric descriptions with reducing significance being assigned to words in an alphanumeric description after the first word in the list.

8. A data storage and retrieval system using an electronic file, comprising:

storage means containing a list of alphanumeric descriptions to each of which is assigned a number;

means for entering data to be stored in terms of an entity type and an attribute of the entity types;

means for retrieving from the said list the respective numbers for the entity type and for the attribute;

means for forming a keyfield by concatenating the number identifying the entity type with the number identifying the attribute of the entity type; and means for writing a record to the electronic file, the record comprising the said keyfield and a data part.

* * * * *